United States Patent [19]

Yamazaki et al.

[11] Patent Number: 5,795,375
[45] Date of Patent: Aug. 18, 1998

[54] WATER COLOR INK FOR RECORDING AND INK-JET RECORDING PROCESS

[75] Inventors: Hideto Yamazaki; Masaya Fujioka; Takeo Kitahara; Masahito Kato, all of Nagoya; Shunichi Higashiyama, Yokkaichi, all of Japan

[73] Assignee: Brother Kogyo Kabushiki Kaisha, Nagoya, Japan

[21] Appl. No.: 743,154

[22] Filed: Nov. 4, 1996

[30] Foreign Application Priority Data

Nov. 13, 1995 [JP] Japan ................................. 7-319564

[51] Int. Cl.$^6$ ................................................ C09D 11/02
[52] U.S. Cl. .............................. 106/31.57; 106/31.27; 106/31.49; 106/31.58
[58] Field of Search .......................... 106/31.27, 31.57, 106/31.58, 31.49

[56] References Cited

U.S. PATENT DOCUMENTS

| | | | |
|---|---|---|---|
| 4,818,285 | 4/1989 | Causley et al. | 106/31.43 |
| 5,016,028 | 5/1991 | Temple | 346/140 R |
| 5,108,504 | 4/1992 | Johnson et al. | 106/31.46 |
| 5,118,350 | 6/1992 | Prasad | 106/31.58 |
| 5,185,034 | 2/1993 | Webb et al. | 106/31.27 |
| 5,485,188 | 1/1996 | Tochihara et al. | 106/31.59 |
| 5,534,051 | 7/1996 | Lauw | 106/31.58 |
| 5,536,306 | 7/1996 | Johnson et al. | 106/31.58 |
| 5,560,771 | 10/1996 | Takemoto et al. | 106/31.27 |

FOREIGN PATENT DOCUMENTS

| | | |
|---|---|---|
| A-64-6074 | 1/1989 | Japan. |
| A-1-204979 | 8/1989 | Japan. |

*Primary Examiner*—Helene Klemanski
*Attorney, Agent, or Firm*—Oliff & Berridge, PLC

[57] ABSTRACT

A water color ink for recording, including a yellow ink, a magenta ink and a cyan ink, wherein the yellow ink contains color index number Acid Yellow 23 at 0.7 to 3 wt %, the magenta ink contains a dye mixture of color index number Acid Red 52 and color index number Acid Red 289 at 0.7 to 3 wt %, and the cyan ink contains color index number Acid Blue 9 at 0.7 to 3 wt %, and an ink-jet recording process using the same.

21 Claims, No Drawings

WATER COLOR INK FOR RECORDING AND INK-JET RECORDING PROCESS

BACKGROUND OF THE INVENTION

1. Field of the Invention

The present invention relates to a water color ink for recording and an ink-jet recording process.

2. Description of Related Art

Ink-jet recording processes include, for example, an electrostatic suction process, a process wherein a piezoelectric device applies mechanical vibration or displacement to ink, and a process comprising heating ink thereby generating bubbles. By such processes, ink droplets are formed and deposited in whole or part on a recording medium such as paper, whereby recording is achieved.

As ink compositions for use in such ink-jet recording processes, a pigment ink composition or a dye ink composition is known, which is produced by dispersing or dissolving a water soluble pigment or a water soluble dye developing various colors in water or a solvent mixture of water with a water soluble organic solvent.

For ink compositions for ink-jet recording, various properties are required such that: no clogging occurs on the nozzle tip or in the ink flow path of a recording system; the physicochemical properties are not changed or the solids are not deposited under storage; a recorded image at sufficiently high concentrations of vivid colors is generated; recording can be done with no limitation to the types of recording medium; the fixing rate on a recording medium is fast; the compositions have good water resistance, weatherability, solvent resistance, and wear resistance; an image of a higher resolution can be generated; and the physicochemical properties such as viscosity and surface tension are within an appropriate range. Among these properties, solution stability is important such that clogging and the appearance of deposits on the nozzle tip or in the ink flow path of a recording system do not occur.

Pigment ink compositions have good weatherability, but have poor solution stability because the pigments are dispersed in solvents. When such compositions are kept under storage for a long term, the dispersibility of the pigments gets so unstable that the pigments accumulate. Hence, the compositions readily cause clogging in an ink-jet recording system at the nozzle tip. As disclosed in Japanese Unexamined Patent Publication No. 1-204979, therefore, pigment ink compositions should have defined compositions. As disclosed in Japanese Unexamined Patent Publication No. 64-6074, furthermore, the improvement of such compositions has been attained by controlling the pH is of water pigment inks. However, such compositions are not satisfactory for use as an ink-jet recording ink.

Dye ink compositions have poorer weatherability than pigment ink compositions. However, because dye ink compositions hardly develop clogging at the nozzle tip or in the ink flow path of a recording system, the compositions are widely used as an ink-jet recording ink.

Such dye ink compositions are in many cases in the form of water ink compositions produced by dissolving water soluble dyes having a variety of chemical structures in water or a solvent mixture of water with a water soluble organic solvent.

For imaging a full colored recorded image using a water dye ink, use is made of four primary colors composed of a black ink and three primary colors, namely a yellow ink, a magenta ink and a cyan ink, and the color tone of the recorded image is determined by mixing those four primary colors. For generating a recorded image of vivid colors, as one of the ink properties as described above, these inks should be required to develop ideal primary colors of yellow, magenta, cyan and black, each never tinted with a different color.

However, dye ink compositions currently introduced into market are not satisfactory with respect to color balance among individual colors of yellow, magenta and cyan, or cannot produce a recorded image of satisfactory sharpness. Thus, these ink compositions should be improved from various aspects.

U.S. Pat. No. 5,185,034 discloses a dye set of a yellow ink comprising Acid Yellow 23, diethylene glycol, an antiseptic and water; a magenta ink comprising Direct Red 227, diethylene glycol, an antiseptic and water; and a cyan ink comprising Acid Blue 9, diethylene glycol, an antiseptic and water. However, the technique disclosed in U.S. Pat. No. 5,185,034 cannot produce a recorded image of satisfactory sharpness although it can improve the color balance.

SUMMARY OF THE INVENTION

So as to overcome the problems described above, the present invention has been carried out. An object of the present invention is to provide a water color ink for recording, being so suitable for ink-jet recording that sharp recorded images with good color balance are generated, together with an ink-jet recording process.

The aforementioned object can be attained by a water color ink for recording comprising a yellow ink, a magenta ink and a cyan ink, wherein the yellow ink contains color index number Acid Yellow 23 at 0.7 to 3% by weight (abbreviated as "wt %" hereinbelow); the magenta ink contains a dye mixture composed of color index number Acid Red 52 and color index number Acid Red 289 at 0.7 to 3 wt %; and the cyan ink contains color index number Acid Blue 9 at 0.7 to 3 wt %.

DETAILED DESCRIPTION OF PREFERRED EMBODIMENTS

The present invention will now be described in detail hereinbelow.

The coloring agent of the yellow ink to be used in accordance with the present invention is color index number Acid Yellow 23 (referred to as "C.I. Acid Yellow 23" hereinafter) as a water soluble acid dye.

The content of the C.I. Acid Yellow 23 is 0.7 to 3wt % to the yellow ink in total. If the content of the C.I. Acid Yellow 23 is less than 0.7 wt % or above 3 wt %, the color concentration of an image recorded via the yellow ink, the magenta ink and the cyan ink is unsatisfactory and also the color balance of the individual colors is poor. Thus, the content should be limited to the range described above.

The coloring agents of the magenta ink to be used in accordance with the present invention are color index number Acid Red 52 (referred to as ""C.I. Acid Red 52 hereinafter) and color index number Acid Red 289 (referred to as "C.I. Acid Red 289" hereinafter) as water soluble acid dyes.

The content of the dye mixture of the C.I. Acid Red 52 and C.I. Acid Red 289 is 0.7 to 3 wt % to the magenta ink in total. If the content of the dye mixture of the C.I. Acid Red 52 and C.I. Acid Red 289 is less than 0.7 wt % or above 3 wt %, the color concentration of an image recorded via the yellow ink, the magenta ink and the cyan ink is unsatisfactory and also the color balance of the individual colors is poor. Thus, the content should be limited to the range described above.

The mixing ratio of the color index number Acid Red 52 to the color index number Acid Red 289 in the magenta dye mixture is preferably from 5:5 to 7:3, and more preferably 6:4.

The coloring agent of the cyan ink to be used in accordance with the present invention is color index number Acid Blue 9 (referred to as "C.I. Acid Blue 9" hereinafter) as a water soluble acid dye.

The content of the C.I. Acid Blue 9 described above is 0.7 to 3 wt % to the cyan ink in total. If the content of the C.I. Acid Blue is less than 0.7 wt % or above 3 wt %, the color concentration of an image recorded via the yellow ink, the magenta ink and the cyan ink is unsatisfactory and also the color balance of the individual colors is poor. Thus, the content should be limited to the range described above.

In accordance with the present invention, the yellow ink, the magenta ink and the cyan ink can be produced by dissolving the coloring agents thereof in a solvent. As such solvent, it is preferable to use water or a solvent mixture of water with a water soluble organic solvent.

As such water, it is not preferable to use general water containing a variety of ions but preferable to use deionized water.

In the solvent mixture of water and a water soluble organic solvent, the water soluble organic solvent is used so as to prevent ink drying.

The water soluble organic solvent is not specifically limited, and can include, for example, lower alcohols, such as methyl alcohol, ethyl alcohol, n-propyl alcohol, isopropyl alcohol, n-butyl alcohol, sec-butyl alcohol and tert-butyl alcohol; amides, such as dimethylforamide and dimethylacetamide; ketones, such as acetone; keto-alcohols, such as diacetone alcohol; ethers, such as tetrahydrofuran and dioxane; polyalkylene glycols, such as polyethylene glycol and polypropylene glycol; alkylene glycols, such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; glycerine; 2-pyrrolidone; N-methyl-2-pyrrolidone; and 1,3-dimethyl-2-imidazolidinone.

Particularly, it is preferable to use alkylene glycols, such as glycerine and diethylene glycol; and lower alkyl ethers of polyhydric alcohols, such as triethylene glycol monoethyl ether.

Preferably, the content of the water soluble organic solvent is generally 0 to 95 wt % to the total weight of each ink. More preferably, the content is 10 to 80 wt % and most preferably, the content is 10 to 50 wt %. The water content then is determined within a wide range, depending on the type and composition of the water soluble organic solvent or depending on the desirable ink properties, and the content is generally 10 to 95 wt %, preferably 10 to 70 wt %, and more preferably 20 to 70 wt % of the total weight of ink.

In accordance with the present invention, conventionally known additives, including, for example, various cationic, anionic and nonionic surfactants; viscosity adjusting agents, such as polyvinyl alcohol, celluloses and water soluble resins; surface tension adjusting agents; and antifungal agents, may be added to the yellow ink, the magenta ink and the cyan ink, if necessary. For preparing a water ink for use in a type of ink-jet recording process wherein the recording solution is charged, furthermore, specific resistance adjusting agents such as inorganic salts, for example, ammonium chloride, may be added satisfactorily.

The water color ink for recording in accordance with the present invention comprises the three primary colors, namely the yellow ink, the magenta ink and the cyan ink, but the ink may comprise four primary colors, by using black ink if necessary.

The ink-jet recording process of the present invention comprises discharging the ink droplets of the water color ink from a discharge nozzle, depending on the recording signal, thereby conducting recording on a recording material.

The recording material is not specifically limited, and can include, for example, simple paper, coated paper transparent film and the like.

If the water color ink for recording is used in accordance with the present invention, the ink can generate a vivid image with good color balance of yellow, magenta and cyan; the ink also realizes an ink-jet recording process with no occurrence of clogging at the nozzle tip or in the ink flow path of an ink-jet recording system.

The water color ink for recording and the ink-jet recording process, in accordance with the present invention, have been described above. Therefore, no clogging occurs at the nozzle tip or in the ink flow path of an ink-jet printer, so that a vivid recorded image can be generated with good balance of yellow, magenta and cyan.

The present invention will now be described in detail in examples, but the invention is not limited to these examples.

Recording paper used in Examples and Comparative Examples is "Xerox 4024 DP 201b", unless otherwise stated.

<EXAMPLE 1>

A yellow ink composition was produced by adding C.I. Acid Yellow 23 (1.5 parts by weight; the term "part(s) by weight" is abbreviated as "wt part(s)" hereinafter), glycerine (22 wt parts), and diethylene glycol-n-monobutyl ether (5 wt parts) into pure water (71.5 wt parts), agitating the resulting mixture for 30 minutes, and subsequently filtering the mixture through a membrane filter of a pore size of 0.7 μm.

Similarly, a magenta ink composition was produced from pure water (72 wt parts), C.I. Acid Red 52 (0.5 wt part), C.I. Acid Red 289 (0.5 wt part), glycerine (22 wt parts), and diethylene glycol-n-monobutyl ether (5 wt parts).

Similarly, a cyan ink composition was produced from pure water (71.7 wt parts), C.I. Acid Blue 9 (1.3 wt parts), glycerine (22 wt parts), and diethylene glycol-n-monobutyl ether (5 wt parts).

For color recording, these ink compositions were used in an ink-jet head of a shear mode type as disclosed in U.S Pat. No. 5,016,028. With excellent jetting, a vivid recorded image was generated with good color balance never tinted with yellow, red or blue.

<EXAMPLE 2>

A yellow ink composition was produced by adding C.I. Acid Yellow 23 (2.5 wt parts), glycerine (22 wt parts), and diethylene glycol-n-monobutyl ether (5 wt parts) into pure water (70.5 wt parts), agitating the resulting mixture for 30 minutes, and subsequently filtering the mixture through a membrane filter of a pore size of 0.7 μm.

Similarly, a magenta ink composition was produced from pure water (70.5 wt parts), C.I. Acid Red 52 (1.5 wt parts), C.I. Acid Red 289 (1 wt part), glycerine (22 wt parts), and diethylene glycol-n-monobutyl ether (5 wt parts).

Similarly, a cyan ink composition was produced from pure water (70.3 wt parts), C.I. Acid Blue 9 (2.7 wt parts), glycerine (22 wt parts), and diethylene glycol-n-monobutyl ether (5 wt parts).

For color recording, these ink compositions were used in the ink-jet head of a shear mode type as disclosed in U.S. Pat. No. 5,016,028. With excellent jetting, a vivid recorded image was generated with good color balance never tinted with yellow, red or blue.

<EXAMPLE 3>

Ink compositions were produced in the same manner as in Example 1, except that a magenta ink composition was prepared at a modified mixing ratio of C.I. Acid Red 52 and C.I. Acid Red 289 at 7:3 but with no change in the total mixture weight. Recording was done in the same way as in Example 1. With excellent jetting, a vivid recorded image was generated with good color balance never tinted with yellow, red or blue.

<EXAMPLE 4>

Ink compositions were produced in the same manner as in Example 1, except that a magenta ink composition was prepared at a modified mixing ratio of C.I. Acid Red 52 and C.I. Acid Red 289 at 6:4 but with no change in the total mixture weight. Recording was done in the same way as in Example 1. With excellent jetting, a vivid recorded image was generated with good color balance never tinted with yellow, red or blue.

<COMPARATIVE EXAMPLE 1>

Ink compositions were produced in the same manner as in Example 1, except that the content of C.I. Acid Yellow 23 was 0.5 wt part. Recording was done in the same way as in Example 1. Irrespective of excellent jetting, the generated recorded image showed poor color balance with pale yellow, and was tinted overall with bluish color, wherein the color to be essentially red was scarlet while the color to be essentially green was bluish green. <COMPARATIVE EXAMPLE 2>

Ink compositions were produced in the same manner as in Example 1, except that the content of C.I. Acid Yellow 23 was 3.5 wt parts. Recording was done in the same way as in Example 1. Irrespective of excellent jetting, the generated recorded image showed poor color balance with pale yellow, and was tinted overall with yellowish color, wherein the color to be essentially red was orange while the color to be essentially green was yellowish green.

<COMPARATIVE EXAMPLE 3>

Ink compositions were produced in the same manner as in Example 1, except that the contents of C.I. Acid Red 52 and C.I. Acid Red 289 both were 0.2 wt part (in total, 0.4 wt part). Recording was done in the same way as in Example 1. Irrespective of excellent jetting, the generated recorded image showed poor color balance with pale magenta, and was tinted overall with greenish color, wherein the color to be essentially red was orange, while the color to be essentially blue was light blue.

<COMPARATIVE EXAMPLE 4>

Ink compositions were produced in the same manner as in Example 1, except that the contents of C.I. Acid Red 52 and C.I. Acid Red 289 both were 1.8 wt parts (in total,3.6 wt parts). Recording was done in the same way as in Example 1. Irrespective of excellent jetting, the generated recorded image showed poor color balance with dark magenta, and was tinted overall with scarlet color, wherein the color to be essentially red was scarlet, while the color to be essentially blue was purple.

<COMPARATIVE EXAMPLE 5>

Ink compositions were produced in the same manner as in Example 1, except that the content of C.I. Acid Blue 9 was modified to 0.5 wt part. Recording was done in the same way as in Example 1. Irrespective of excellent jetting, the generated recorded image showed poor color balance with pale cyan, and was tinted overall with reddish color, wherein the color to be essentially blue was purple, while the color to be essentially green was yellowish green.

<COMPARATIVE EXAMPLE 6>

Ink compositions were produced in the same manner as in Example 1, except that the content of C.I. Acid Blue 9 was modified to 3.5 wt parts. Recording was done in the same way as in Example 1. Irrespective of excellent jetting, the generated recorded image showed poor color balance with dark cyan, and was tinted overall with bluish color, wherein the color to be essentially blue was light blue, while the color to be essentially green was bluish green.

<COMPARATIVE EXAMPLE 7>

Ink compositions were produced in the same manner as in Example 1, except that color index number Direct Yellow 86 was used in place of C.I. Acid Yellow 23. Recording was done in the same way as in Example 1. Irrespective of excellent jetting, the generated recorded image showed poor color balance, wherein yellow turned bright yellow.

<COMPARATIVE EXAMPLE 8>

Ink compositions were produced in the same manner as in Example 1, except that a magenta ink composition was prepared by using only C.I. Acid Red 289 (1 wt part) .Recording was done in the same way as in Example 1. Irrespective of excellent jetting, the generated recorded image showed poor overall color balance, wherein magenta was tinted with pink color.

<COMPARATIVE EXAMPLE 9>

Ink compositions were produced in the same manner as in Example 1, except that a cyan ink was prepared by using color index number Direct Blue 86 in place of C.I. Acid Blue 9. Recording was done in the same way as in Example 1. Irrespective of excellent jetting, the generated recorded image showed poor overall color balance, wherein cyan was tinted with bluish color.

<COMPARATIVE EXAMPLE 10>

Ink compositions were produced in the same manner as in Example 1, except that the content of C.I. Acid Yellow 23 was 0.5 wt part; the content of C.I. Acid Red 52 was 0.2 wt part; the content of C.I. Acid Red 289 was 0.2 wt part; and the content of C.I. Acid Blue 9 was 0. 5 wt part. Recording was done in the same way as in Example 1. Irrespective of excellent jetting, the color of the generated recorded image was entirely pale, with unsatisfactory color concentrations.

<COMPARATIVE EXAMPLE 11>

Ink compositions were produced in the same manner as in Example 1, except that the content of C.I. Acid Yellow 23 was 3.5 wt parts; the content of C.I. Acid Red 52 was 1.8 wt parts; the content of C.I. Acid Red 289 was 1.8 wt parts; and the content of C.I. Acid Blue 9 was 3.5 wt parts. Recording was done in the same way as in Example 1. Irrespective of excellent jetting, the color of the generated recorded image was entirely pale and dark, with unsatisfactory vividness.

As has been described above, in any of the ink compositions of Examples 1 to 4 generating good color balanced and vivid recorded images with good jetting, C.I. Acid Yellow 23 is used as the coloring agent of the yellow ink, a dye mixture of C.I. Acid red 52 and C.I. Acid Red 289 is used as the coloring agent of the magenta ink, and C.I. Acid Blue 9 is used as the coloring agent of the cyan ink.

The concentration of the C.I. Acid Yellow 23 was 0.7 to 3 wt %; the concentration of the mixture of the C.I. Acid Red 52 and the C.I. Acid Red 289 was 0.7 to 3 wt %; and the concentration of the C.I. Acid Blue 9 was 0.7 to 3 wt %.

In contrast, none of Comparative Examples 1 to 11 with non-vivid, poorly color balanced recorded images, satisfied the requirements described above.

What is claimed is:

1. A plurality of water color inks for recording, comprising:
    a yellow ink comprising a yellow ink solvent and 0.7 to 3 wt % color index number Acid Yellow 23;
    a magenta ink comprising a magenta ink solvent and 0.7 to 3 wt % of a dye mixture of color index number Acid Red 52 and color index number Acid Red 289; and
    a cyan ink comprising a cyan ink solvent and 0.7 to 3 wt % color index number Acid Blue 9.

2. The plurality of inks according to claim 1, which is packaged in an ink-jet cartridge.

3. The plurality of inks according to claim 1, wherein a mixing ratio of said color index number Acid Red 52 to said color index number Acid Red 289 in said magenta ink dye mixture is from 5:5 to 7:3.

4. The plurality of inks according to claim 3, wherein the mixing ratio is 6:4.

5. The plurality of inks according to claim 1, wherein the yellow, magenta and cyan ink solvents are water.

6. The plurality of inks according to claim 1, wherein said yellow, magenta and cyan ink solvents are solvent mixtures comprising water and at least one water soluble organic solvent.

7. The plurality of inks according to claim 6, wherein said at least one water soluble organic solvent is an alkylene glycol.

8. The plurality of inks according to claim 7, wherein said at least one water soluble organic solvent is at least one of glycerin and diethylene glycol.

9. The plurality of inks according to claim 6, wherein said at least one water soluble organic solvent is a lower alkyl ether of a polyhydric alcohol.

10. The plurality of inks according to claim 9, wherein said at least one water soluble organic solvent is triethylene glycol monoethylether.

11. The plurality of inks according to claim 6, wherein said at least one water soluble organic solvent is at least one member selected from the group consisting of lower alcohols, amides, ketones, ketoalcohols, ethers, polyalkylene glycols, alkylene glycols and lower alkyl ethers of polyhydric alcohols.

12. The plurality of inks according to claim 6, wherein said at least one water soluble organic solvent is at least one member selected from the group consisting of methyl alcohol, ethyl alcohol, n-propyl alcohol, isopropyl alcohol, n-butyl alcohol, sec-butyl alcohol, tert-butyl alcohol, dimethyl formamide, dimethyl acetoamide, acetone, diacetone alcohol, tetrahydrofuran, dioxane, polyethylene glycol, polypropylene glycol, ethylene glycol, propylene glycol, butylene glycol, diethylene glycol, triethylene glycol, dipropylene glycol, tripropylene glycol, thiodiglycol, hexylene glycol, ethylene glycol monomethylether, ethylene glycol monoethylether, diethylene glycol monomethylether, diethylene glycol monoethylether, diethylene glycol monobutylether, triethylene glycol monomethylether, triethylene glycol monoethylether, triethylene glycol monobutylether, glycerin, 2-pyrrolidone, N-methyl-2-pyrrolidone and 1,3-dimethyl-2-imidazolidinone.

13. The plurality of inks according to claim 1, wherein said yellow, magenta and cyan ink solvents each comprises 0 to 95 wt % of at least one water soluble organic solvent and 10 to 95 wt % water.

14. The plurality of inks according to claim 1, wherein said yellow, magenta and cyan ink solvents each comprises 10 to 80 wt % of at least one water soluble organic solvent and 10 to 70 wt % water.

15. The plurality of inks according to claim 1, wherein said yellow, magenta and cyan ink solvents each comprises 10 to 50 wt % of at least one water soluble organic solvent and 20 to 70 wt % water.

16. An ink-jet recording process comprising ejecting yellow, magenta and cyan ink droplets from at least one nozzle onto a substrate to record a colored pattern of said ink droplets on said substrate, wherein said ink droplets are formed from the plurality of inks according to claim 1.

17. The ink-jet recording process according to claim 16, wherein a mixing ratio of said color index number Acid Red 52 to said color index number Acid Red 289 in said magenta ink dye mixture is from 5:5 to 7:3.

18. The ink-jet recording process according to claim 17, wherein the mixing ratio is 6:4.

19. The ink-jet recording process according to claim 16, wherein said yellow, magenta and cyan ink solvents are solvent mixtures comprising water and at least one water soluble organic solvent.

20. The ink-jet recording process according to claim 19, wherein said yellow, magenta and cyan ink solvents each comprises 10 to 80 wt % of at least one water soluble organic solvent and 10 to 70 wt % water.

21. An ink-jet recording process comprising ejecting ink droplets from at least one nozzle onto a substrate to record a colored pattern of said ink droplets on said substrate, wherein said ink droplets are formed from two of the plurality of inks according to claim 1.

* * * * *